(12) United States Patent
Sauerlaender (10) Patent No.: US 9,088,172 B2
(45) Date of Patent: Jul. 21, 2015

(54) HARMONIC COMPENSATION CIRCUIT AND METHOD FOR AN LED LIGHT UNIT

(75) Inventor: Georg Sauerlaender, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1251 days.

(21) Appl. No.: 12/995,488

(22) PCT Filed: Jun. 8, 2009

(86) PCT No.: PCT/IB2009/052417
§ 371 (c)(1),
(2), (4) Date: Dec. 1, 2010

(87) PCT Pub. No.: WO2009/153696
PCT Pub. Date: Dec. 23, 2009

(65) Prior Publication Data
US 2011/0089868 A1    Apr. 21, 2011

(30) Foreign Application Priority Data
Jun. 17, 2008   (EP) ..................... 08104445

(51) Int. Cl.
*H02J 3/01* (2006.01)
*H05B 33/08* (2006.01)
(52) U.S. Cl.
CPC .............. *H02J 3/01* (2013.01); *H05B 33/0815* (2013.01); *Y02E 40/40* (2013.01)
(58) Field of Classification Search
CPC ............ H05B 37/00; H05B 37/02; H02J 3/01
USPC .......................... 315/291, 294, 297, 312, 308
See application file for complete search history.

(56) References Cited

U.S. PATENT DOCUMENTS

| 4,119,907 A * | 10/1978 | Quinn | ........................... 323/208 |
| 2006/0214603 A1* | 9/2006 | Oh et al. | ........................ 315/246 |

(Continued)

FOREIGN PATENT DOCUMENTS

| CN | 201054825 Y | 4/2008 |
| DE | 102007012699 A1 | 9/2008 |

(Continued)

OTHER PUBLICATIONS

Chattopadhyay et al: "Impedance Emulation Method for a Single Phase Shunt Active Filter"; 18th Annual IEEE Applied Power Electronics Conference and Exposition, Feb. 2003, vol. 2,M pp. 907-912.

(Continued)

*Primary Examiner* — Douglas W Owens
*Assistant Examiner* — Jonathan Cooper
(74) *Attorney, Agent, or Firm* — Yuliya Mathis (57) ABSTRACT

The present invention relates to a harmonic compensation circuit for compensating at least the third harmonic in the input current ($I_{mains}$) drawn by an LED light source (1) from a mains voltage supply (2), comprising: a signal input (21, 22) for receiving a first input signal proportional to the input voltage ($V_{in}$) of said LED light source (1) and a second input signal ($V_{sh}$) proportional to the LED current ($I_{LED}$) of said LED light source (1), a signal output (25) for outputting a compensation current (Icomp), a processing unit (24a, 24b) for comparing said second input signal ($V_{sh}$) to a reference signal ($V_{Rb}$, $V_{R7}$) and for generating said compensation current ($I_{comp}$) based on said comparison, the sum of said compensation current ($I_{comp}$) and said LED current ($I_{LED}$) being proportional to the input voltage ($V_{in}$) of said LED light source (1) and said compensation current ($I_{comp}$) being provided for minimizing at least the third harmonic in the input current ($I_{mains}$) drawn by said LED light source (1) from said mains voltage supply (2).

20 Claims, 6 Drawing Sheets

(56) References Cited

U.S. PATENT DOCUMENTS

2007/0080652 A1*   4/2007   Elferich et al. ............... 315/291
2009/0009100 A1*   1/2009   Rooymans .................... 315/246

FOREIGN PATENT DOCUMENTS

| | | |
|---|---|---|
| JP | 10014109 A | 1/1998 |
| JP | 2006244848 A | 9/2006 |
| WO | 0101385 A1 | 1/2001 |
| WO | 2005112219 A1 | 10/2005 |
| WO | 2006085767 A2 | 8/2006 |

OTHER PUBLICATIONS

Massoud et al: "Review of Harmonic Current Extraction Techniques for an Active Power Filter"; 11th International IEEE Conference on Harmonics and Quality of Power, 2004, pp. 154-159.

* cited by examiner

HARMONIC COMPENSATION CIRCUIT AND METHOD FOR AN LED LIGHT UNIT

FIELD OF THE INVENTION

The present invention relates to a harmonic compensation circuit and a corresponding method for compensating at least the third harmonic in the input current drawn by an LED light source from a mains voltage supply. Further, the present invention relates to an LED light unit.

BACKGROUND OF THE INVENTION

Especially in retrofit-type of applications, i.e. new products that can directly replace old incandescent lamps, halogen lamps or others, having the same geometric dimensions and fittings (e.g. E14, E27) and using the already existing infrastructure in homes and buildings, driver efficiency and cost are crucial for making LED (Light Emitting Diode)-based light sources a success. For this reason, the idea of connecting strings of LEDs directly to the AC mains voltage, only ballasted by a series resistor, has come up. The efficiency of such a driver is about 80%, which is not very high, but still gives an unmatched form factor and performance to price ratio.

A major drawback of this approach is that the current that is drawn from the AC mains voltage suffers from a rather large third harmonic component. At present this is not an issue because the standard that limits this current does not apply to light sources with nominal input power levels of less than 25 W. In the near future (i.e. in the coming 1-3 years), however, this boundary will be lowered to 5 W and extended to cover also solid state light sources, thereby effectively limiting the overall light output of an ACLED solution.

SUMMARY OF THE INVENTION

It is an object of the present invention to provide a harmonic compensation circuit and a corresponding method as well as an LED light unit by means of which at least the third harmonic will be suppressed sufficiently to meet future standards.

In a first aspect of the present invention a harmonic compensation circuit is presented for compensating at least the third harmonic in the input current drawn by an LED light source from a mains voltage supply, comprising:
  a signal input for receiving a first input signal proportional to the input voltage of said LED light source and a second input signal proportional to the LED current of said LED light source,
  a signal output for outputting a compensation current,
  a processing unit for comparing said second input signal to a reference signal and for generating said compensation current based on said comparison, the sum of said compensation current and said LED current being proportional to the input voltage of said LED light source and said compensation current being provided for minimizing at least the third harmonic in the input current drawn by said LED light source from said mains voltage supply.

In a further aspect of the present invention a corresponding harmonic compensation method is presented as claimed in claim 14.

In a further aspect of the present invention an LED light unit is presented comprising:
  an LED light source,
  a mains voltage supply input for receiving an input voltage and an input current from a mains voltage supply, and
  a harmonic compensation circuit as claimed in claim 1 for compensating at least the third harmonic in the input current drawn by said LED light source from said mains voltage supply, said harmonic compensation circuit being coupled to said LED light source for receiving a first input signal proportional to the input voltage of said LED light source and a second input signal proportional to the LED current of said LED light source.

Preferred embodiments of the invention are defined in the dependent claims. It shall be understood that the claimed method and the claimed LED light unit have similar and/or identical preferred embodiments, as defined in the dependent claims of claim 1.

According to the present invention a simple electronic circuit is proposed that effectively suppresses the third harmonic of the mains input current of the LED light source (also called ACLED module), thus making it possible to continue using the current (conventional) LED light sources after the introduction of the new limit and increase the light output to much higher values.

The present invention is based on the idea that the instantaneous current of the LED light source is measured and compared to a reference current. The difference between the two currents is drawn into an additional (e.g. programmable) current source that is connected in parallel with the actual LED light source, enabling continuous use of the current LED light source beyond the time the new standard will become effective and at significantly increased power levels compared to the case where no third harmonic compensation is in place.

In particular, according to the present invention a compensation current is generated and outputted such that the sum of said compensation current and the original LED current is preferably proportional to the input voltage of said LED light source, but at least shows a reduced third harmonic current component that is below the legally required maximum limits (without violating the limits of the other harmonics).

In a preferred embodiment said first input signal is the input voltage of said LED light source and said second input signal is obtained from said LED current of said LED light source. This has the advantage that based on these two signals a unity power factor can be achieved, so that not only the third current harmonic is compensated but also the higher order harmonics.

In another embodiment said reference signal is proportional to the input voltage of said LED light source. This has the advantage that fewer losses are generated and still a reasonable third harmonic current compensation is achievable.

Preferably, said processing unit comprises no reactive elements, which is cost-effective and requires the least physical space for implementation.

Advantageously, said processing unit is adapted for comparing said LED current to a reference current. This has the advantage that with the right reference current a unity power factor can be achieved.

In a practical embodiment said processing unit comprises a first operational amplifier for measuring a voltage difference representing the difference between the LED current and a reference current that is proportional to the input voltage of said LED light source.

In an implementation of the claimed circuit, said processing unit comprises a first transistor coupled to the output of said first operational amplifier and a second transistor for short-cutting the base input voltage of said first transistor for disabling the second operational amplifier as long as the LED current is higher than a predetermined minimum current.

Further, said processing unit preferably comprises resistors for setting said minimum current threshold.

In another practical embodiment said processing unit comprises a comparator for comparing a voltage proportional to the LED current with a reference current, and a second operational amplifier for voltage to current conversion, wherein said comparator is adapted to disable the voltage to current converter as long as the LED current is larger than the reference current. This has the advantage that the compensation current is only generated when the current through the LED light source is below a certain minimum current (i.e. virtually zero), thus limiting the additional losses generated by the compensation current but still achieving a reasonable attenuation of the third harmonic current.

Preferably, said processing unit comprises a plurality of resistors added to said first operational amplifier for magnifying or reducing said LED current and/or said reference current in amplitude, and a second operational amplifier for voltage to current conversion. This has the advantage that the signal processing can be done at a low power voltage level. The conversion to the required compensation current is done as the final step in the analog signal processing chain, thus minimising additional losses.

In a preferred embodiment of the LED light unit, said harmonic compensation circuit is coupled to said mains voltage supply in parallel with said LED light source. This has the advantage that the performance of the original LED light source is not disturbed by the added compensation circuit (besides the negligible effect of the additional shunt resistor in series with the LED light source).

Still further, a rectifying circuit can be provided for rectifying an AC mains voltage input and for outputting the rectified mains voltage input to said mains voltage supply input.

BRIEF DESCRIPTION OF THE DRAWINGS

These and other aspects of the invention will be apparent from and elucidated with reference to the embodiment(s) described hereinafter. In the following drawings

DETAILED DESCRIPTION OF THE INVENTION

Figure 1A:
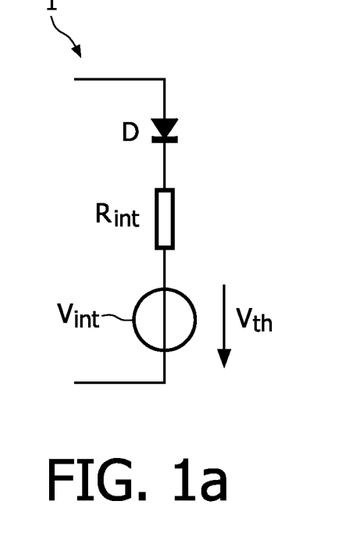
FIG. 1 shows a simple equivalent electrical circuit of an LED.
Figure 1B:
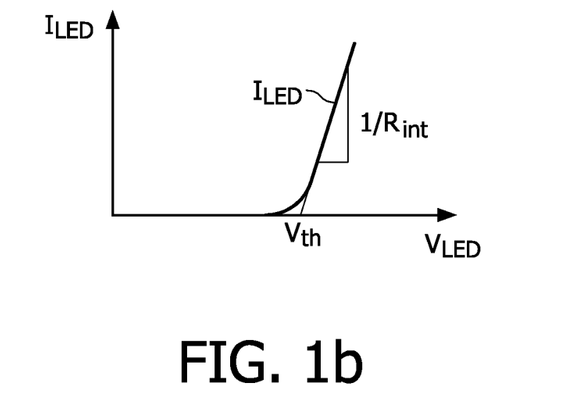

FIG. 1a shows a simple equivalent electrical circuit 1 of an LED, said equivalent circuit comprising a diode D, an internal resistor $R_{int}$ and a voltage source $V_{int}$ providing a threshold voltage $V_{th}$, said elements being connected in series. FIG. 1b shows the typical current waveform $I_{LED}(t)$ of said LED light source 1.

Figure 2A:
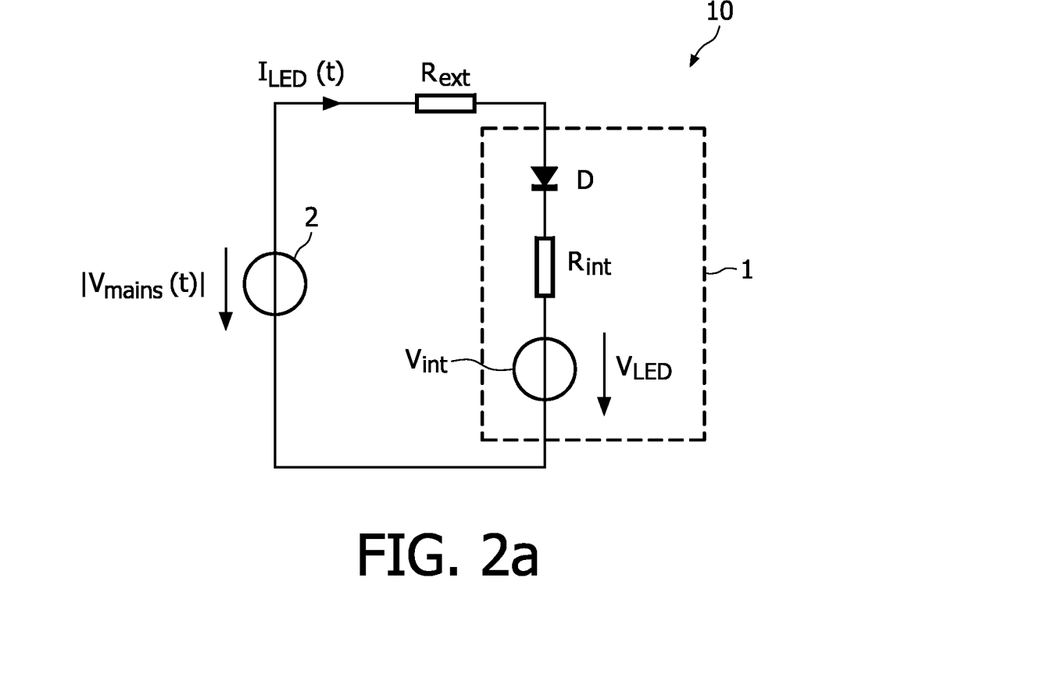
FIG. 2 shows an equivalent circuit and typical voltage and current waveforms of a known LED light unit.
Figure 2B:
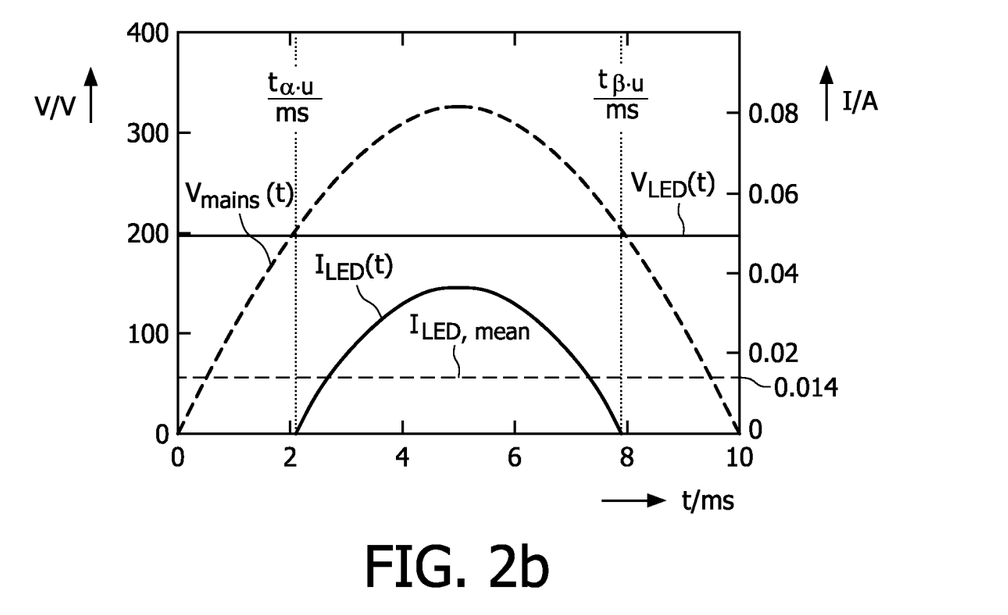

FIG. 2a shows an equivalent circuit of a conventional LED light unit 10 including an LED light source 1, a DC mains voltage supply 2 providing the (rectified) mains voltage $V_{mains}(t)$ and an external ballast resistor $R_{ext}$. FIG. 2b shows the mains voltage $V_{mains}(t)$ (=230 Veff), the typical voltage $V_{LED}$ (=198 Vdc) and current waveform $I_{LED}(t)$ (with $I_{LED,mean}$=14 mA) of said LED light unit 10.

The LED current $I_{LED}(t)$ shown in FIG. 2b does not comply with the new mains harmonic limits for solid state lighting that will become effective 1-3 years from now for SSL (Solid State Lighting) equipment having an input power of >5 W. For this reason, once the new standard becomes effective, the LED light units (ACLED modules) existing today will not be usable for future applications that require an input power of higher than 5 W-, unless additional PFC (Power Factor Correction) measures are taken. If these PFC measures require additional expensive or voluminous components or circuits, the simplicity of such LED light units will, however, be gone, probably eliminating their current unique selling points.

Figure 3:
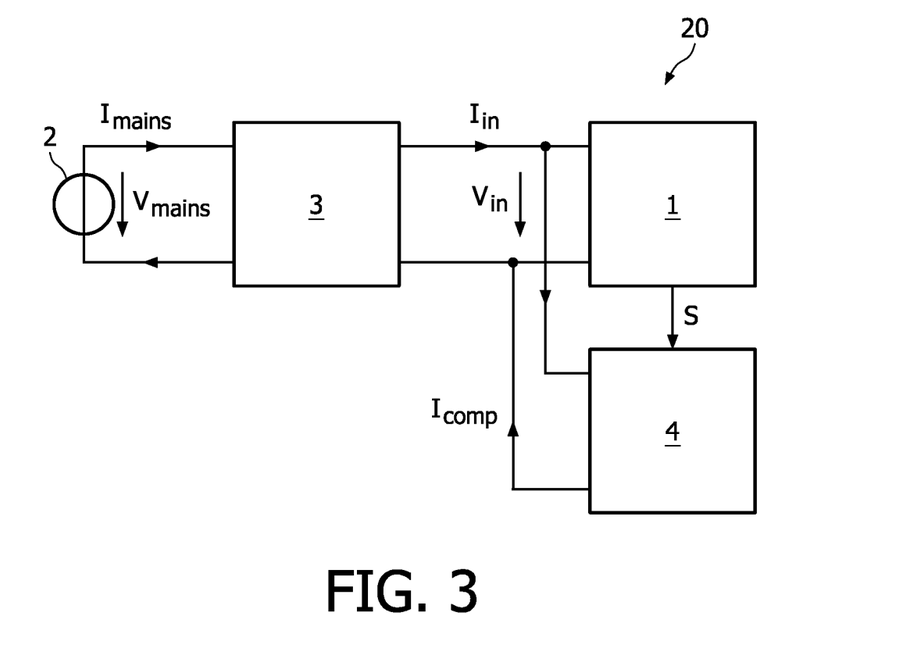
FIG. 3 shows a block diagram LED light unit according to the present invention.

According to the present invention, a simple additional electrical circuit is proposed by which the third harmonic of the input current of the LED light source drawn from the mains supply can be significantly attenuated. FIG. 3 shows a basic block diagram of an LED light unit 20 according to the present invention. A harmonic compensation circuit 4 is connected in parallel with the actual LED light source 1, which is provided with a (rectified) input voltage $V_{in}$ and a rectified input current $I_{in}$ from a rectifier 3, which is provided with a mains voltage $V_{mains}$ and a mains current $I_{mains}$ from a mains voltage supply 2. The harmonic compensation circuit 4 receives—besides the input voltage $V_{in}$—an additional input signal S that is proportional to the LED current $I_{LED}(t)$. Based on these input signals ($V_{in}$, $I'_{LED}(t)$), a compensation current $I_{comp}(t)$ is generated in the harmonic compensation circuit 4, such that the harmonic content of the mains current $I_{mains}(t)$ (e.g. its third harmonic component) is minimized, without compromising the maximum current limits of the other current harmonics.

Figure 4:
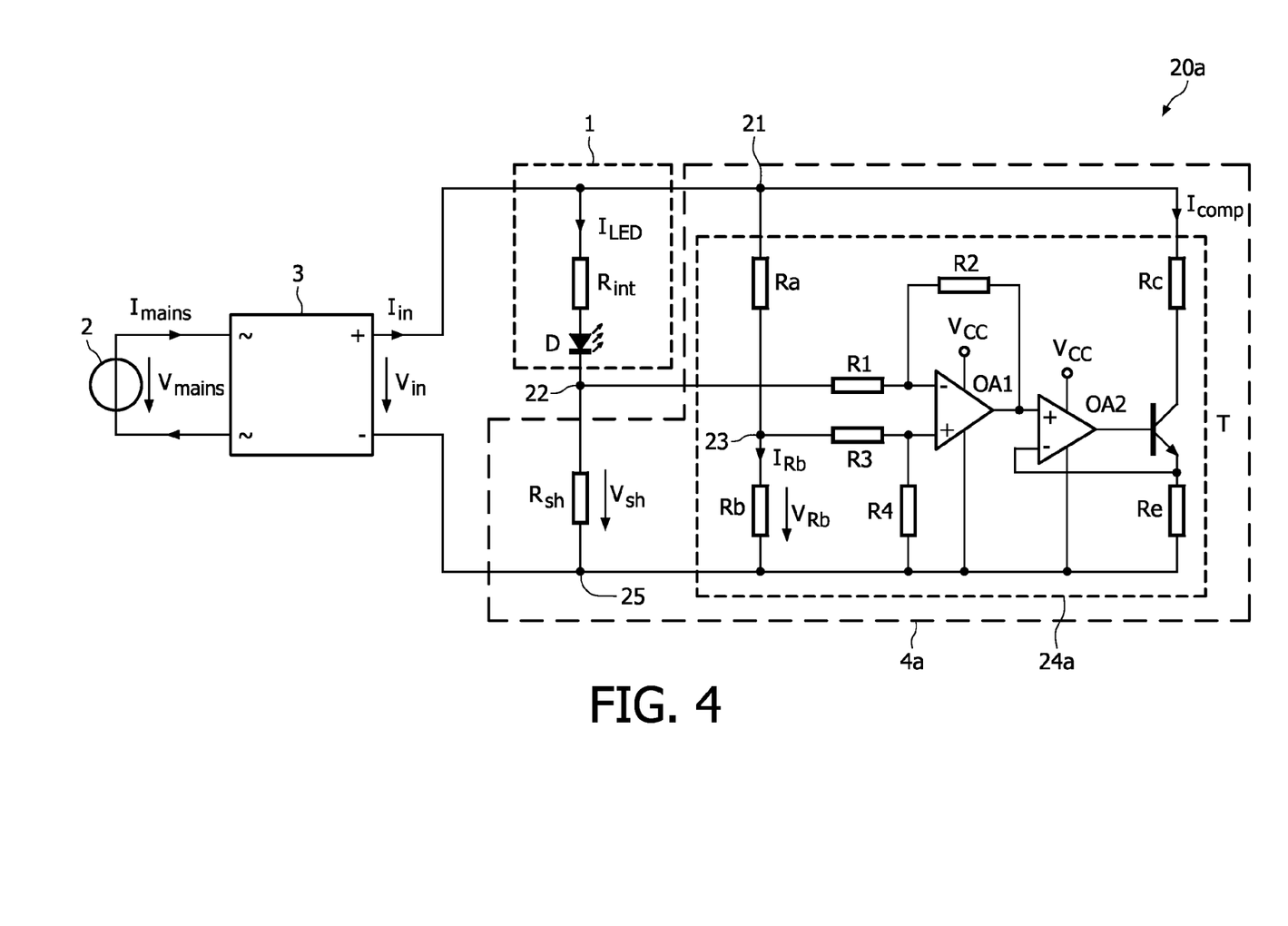
FIG. 4 shows a block diagram of a first embodiment of a harmonic compensation circuit according to the present invention.

A first embodiment of an LED light unit 20a including a first embodiment of a compensation circuit 4a according to the present invention, by means of which the object of the invention can be achieved, is shown in FIG. 4. The harmonic compensation circuit 4a comprises a signal input 21 for receiving the input voltage $V_{in}$ of said LED light source 1 and a signal input 22 for receiving an input voltage signal $V_{sh}$, which is proportional to the LED current $I_{LED}$ of said LED light source 1 and which is provided to the inverting input of the first operational amplifier OA1 acting as comparator. It further comprises an internal voltage signal $V_{Rb}$ at terminal 23, which is proportional to the input voltage $V_{in}$ and which is provided to the non-inverting input of the first operational amplifier OA1. $V_{Rb}$ is proportional to the (ohmic) reference current $I_{Rb}$. If a properly performing control loop is used, $I_{Rb}$ ($V_{Rb}$) should be directly proportional to the lamp input current $I_{in}$ (which should be proportional to $V_{in}$ for a power factor of unity).

A processing unit 24a is provided for comparing said LED current $I_{LED}$ (represented by the voltage $V_{sh}$) to a reference current $I_{Rb}$ (represented by the reference voltage $V_{Rb}$ across the resistor Rb that is part of the voltage divider circuit Ra, Rb), and for generating said ohmic compensation current $I_{comp}$ such that of the mains current $I_{mains}$ drawn by said LED light source 1 from said mains voltage supply 2 the third harmonic—being the one that most often violates the limits given in the lighting norm IEC 61000-3-2—is minimized without compromising the maximum current limits of the other current harmonics. Said compensation current $I_{comp}$ is basically outputted at signal output 25 (assuming that the currents of the signal processing electronics are negligible compared to said compensation current, which is practically the case).

The first operational amplifier OA1—implemented as a differential amplifier—measures the difference between the reference voltage $V_{Rb}$ across Rb and the voltage $V_{sh}$ across $R_{sh}$ (i.e. $V_{Rb}$-$V_{sh}$). This voltage difference represents the difference between the current $I_{LED}$(t) and the reference current $I_{Rb}$ that is proportional to the rectified AC input voltage $V_{in}$ (the current through resistor Rb). With the resistors R2, R1 as well as the resistors R4, R3, both currents can be magnified or reduced in amplitude, such that $V_{in}$*Rb/(Ra+Rb)*(R1+R2)/R1*R4/(R3+R4)−$V_{sh}$*R2/ R1=$I_{comp}$*Re (with $V_{sh}$=$I_{LED}$*$R_{sh}$), where the second operational amplifier OA2 is configured as a voltage to current converter (together with resistor Re and transistor T).

Hence, according to the present invention an additional current $I_{comp}$ is generated such that the sum of the currents $I_{LED}$ and $I_{comp}$ ($I_{LED}$+$I_{comp}$=$I_{in}$), assuming that the current through resistor Ra is small compared to the currents $I_{comp}$ and $I_{in}$ and therefore can be neglected, is proportional to the input voltage $V_{in}$. Thus, the additional current $I_{comp}$ has, by definition, a power factor of 1 (as long as the input voltage $V_{in}$ is sinusoidal). The complete load—seen from input voltage $V_{in}$ (or also $V_{mains}$)—behaves resistively, i.e. there is an equivalent load resistance, which would draw the same current as the compensated LED light source 1. This is the ideal situation aimed at by the electricity suppliers.

Figure 5:
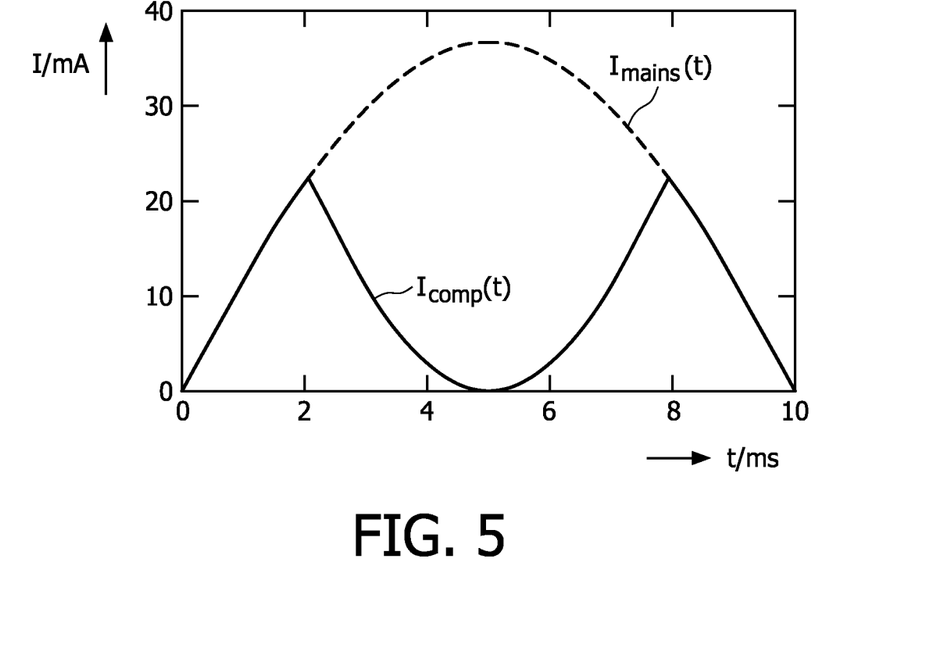
FIG. 5 shows a diagram of the voltage and current signals in an LED light unit including a harmonic compensation circuit as shown in FIG. 4.

FIG. 5 shows a diagram of the voltage and current signals in an LED light unit including a harmonic compensation circuit as shown in FIG. 4. In particular, the mains current $I_{mains}$ and the compensation current $I_{comp}$ are shown. The additional losses introduced by the compensation circuit are in the order of 20% of the nominal input power of the LED light source.

Thus, according to the present invention, a simple additional electrical circuit is proposed by which the third harmonic of the input current of the LED light source drawn from the mains supply can be significantly attenuated so that the new limits will be met. In the particular case of the circuit shown in FIG. 4, the power factor of the complete circuit even approaches unity, meaning that not only the third harmonic but also all the other harmonics are compensated. With this circuit—that is well suited for integration—the simple LED light source design can continue to be used without the need for modifications. In addition, the usable power range can be extended to much higher lumen packages. The additional current drawn from the mains supply causes only little additional losses, the efficiency degradation of which will soon be compensated for by the steadily increasing lumen efficacy of the LEDs (Haitz' Law).

Figure 6:
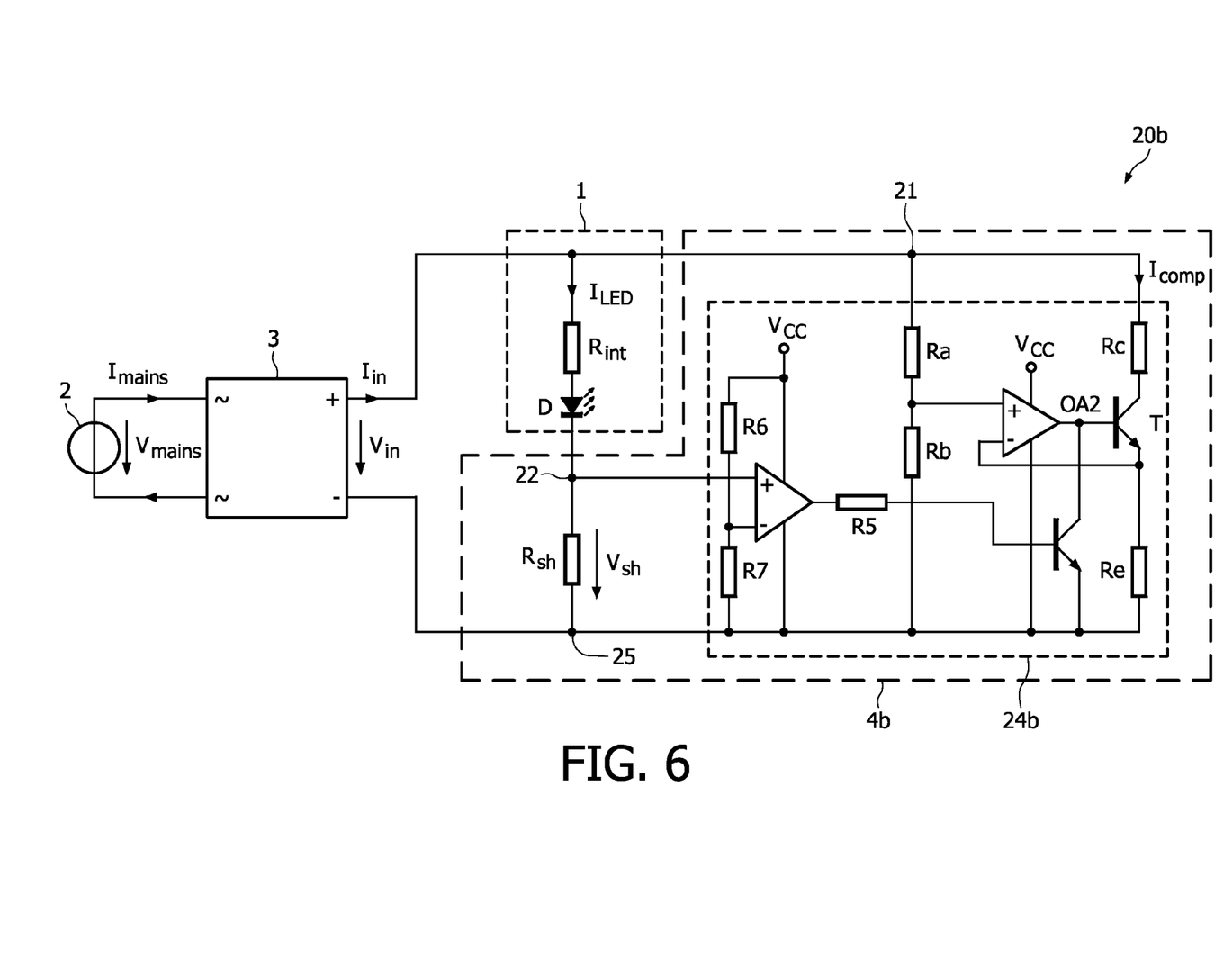
FIG. 6 shows a block diagram of a second embodiment of a harmonic compensation according to the present invention.

FIG. 6 shows a second embodiment of an LED light unit 20b including a second embodiment of a compensation circuit 4b according to the present invention. In this embodiment the compensation circuit 4b generates only about 8% of the nominal input power of the LED light source (with a somewhat lower power factor). The additional input current shaping current (that is proportional to the input voltage $V_{in}$) is only drawn when the current $I_{LED}$ through the LED light source 1 is below a lower threshold current (near zero).

Unlike the circuit shown in FIG. 4, the circuit of FIG. 6 generates a current that is proportional to the mains input voltage only. The voltage to current converter stage only receives a voltage proportional to the input voltage $V_{in}$ (voltage divider Ra, Rb). An additional transistor T2 short circuits the base input voltage of transistor T1, effectively disabling the voltage to current converter OA2, as long as the current $I_{LED}$ through the LED (string) is higher than a certain minimum current. This minimum current threshold can be set via the choice of the resistors R6, R7 that program the reference voltage of the first comparator that is proportional to the desired threshold current.

The required supply voltage $V_{cc}$ for the harmonic compensation circuit (cf. FIGS. 3, 4) can be generated using known circuits.

Figure 7:
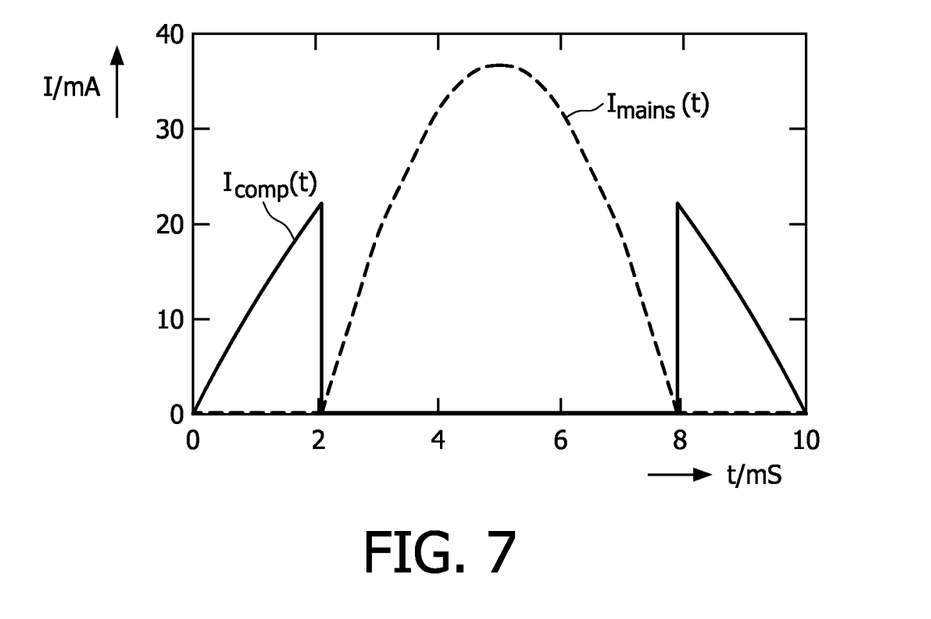
FIG. 7 shows a diagram of the voltage and current signals in an LED light unit including a harmonic compensation circuit as shown in FIG. 6.

FIG. 7 shows a diagram of the voltage and current signals in an LED light unit including a harmonic compensation circuit as shown in FIG. 6. In particular, the mains current $I_{mains}$ and the compensation current $I_{comp}$ are shown.

The present invention can preferably be applied in AC driving of LEDs (ACLED), but is not limited to this application.

In summary, the present invention discloses a simple electronic circuit that effectively suppresses the third harmonic of the mains input current of an LED light source, making it possible to increase the light output to much higher values. The additional losses introduced by this additional circuit will only slightly lower the overall efficiency of the complete light source (measured in 1 m/W).

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A harmonic compensation circuit for compensating at least the third harmonic in an input current drawn by an LED light source from a mains voltage supply, the harmonic compensation circuit comprising:
    a signal input for receiving a first input signal proportional to an input voltage of the LED light source and a second input signal proportional to an LED current of the LED light source;
    a signal output for outputting a compensation current; and
    a processing unit for comparing the second input signal to a reference signal and for generating the compensation current based on the comparison, the sum of the compensation current and the LED current being proportional to the input voltage of the LED light source and the compensation current being provided for minimizing at least the third harmonic in the input current drawn by the LED light source from the mains voltage supply.

2. The harmonic compensation circuit of claim 1, wherein the first input signal is the input voltage of the LED light source and the second input signal is obtained from the LED current of the LED light source.

3. The harmonic compensation circuit of claim 1, wherein the reference signal is proportional to the input voltage of the LED light source.

4. The harmonic compensation circuit of claim 1, wherein the processing unit comprises no reactive elements.

5. The harmonic compensation circuit of claim 1, wherein the processing unit is adapted for comparing the LED current to a reference current.

6. The harmonic compensation circuit of claim 1, wherein the processing unit comprises a comparator, in particular including a first operational amplifier, for comparing a voltage proportional to the LED current with a reference current, and a second operational amplifier for voltage to current conversion, wherein the comparator is adapted to disable the voltage to current converter as long as the LED current is larger than the reference current.

7. The harmonic compensation circuit of claim 6, wherein the processing unit comprises a plurality of resistors added to the comparator for magnifying or reducing at least one of the LED current and the reference current in amplitude.

8. The harmonic compensation circuit of claim 1, wherein the processing unit comprises a first operational amplifier for measuring a voltage difference representing a difference between the LED current and a reference current, and a second operational amplifier for voltage to current conversion.

9. The harmonic compensation circuit of claim 8, wherein the processing unit comprises a first transistor coupled to the output of the first operational amplifier and a second transistor for short circuiting a base input voltage of the first transistor for disabling the second operational amplifier as long as the LED current is greater than a predetermined minimum current threshold.

10. The harmonic compensation circuit of claim 9, wherein the processing unit comprises resistors for setting the minimum current threshold.

11. An LED light unit, comprising:
an LED light source;
a mains voltage supply input for receiving an input voltage and an input current from a mains voltage supply; and
a harmonic compensation circuit coupled to the LED light source, the harmonic compensation circuit comprising:
a signal input for receiving a first input signal proportional to an input voltage of the LED light source and a second input signal proportional to an LED current of the LED light source;
a signal output for outputting a compensation current; and
a processing unit for comparing the second input signal to a reference signal and for generating the compensation current based on the comparison, the sum of the compensation current and the LED current being proportional to the input voltage of the LED light source and the compensation current being provided for minimizing at least the third harmonic in the input current drawn by the LED light source from the mains voltage supply.

12. The LED light unit of claim 11, wherein the harmonic compensation circuit is coupled to the mains voltage supply in parallel with said LED light source.

13. The LED light unit of claim 11, further comprising a rectifying circuit for rectifying an AC mains voltage input and for outputting the rectified mains voltage input to the mains voltage supply input.

14. A method for compensating at least the third harmonic in an input current drawn by an LED light source from a mains voltage supply, the method comprising:
receiving a first input signal proportional to an input voltage of the LED light source;
receiving a second input signal proportional to an LED current of the LED light source;
comparing the second input signal to a reference signal;
generating a compensation current based on the comparison, the sum of the compensation current and the LED current being proportional to the input voltage of the LED light source and the compensation current being provided for minimizing at least the third harmonic in the input current drawn by the LED light source from the mains voltage supply; and
outputting the compensation current.

15. The LED light unit of claim 11, wherein the first input signal is the input voltage of the LED light source and the second input signal is obtained from the LED current of the LED light source.

16. The LED light unit of claim 11, wherein the reference signal is proportional to the input voltage of the LED light source.

17. The LED light unit of claim 11, wherein the processing unit is adapted for comparing the LED current to a reference current.

18. The method of claim 14, wherein the first input signal is the input voltage of the LED light source and the second input signal is obtained from the LED current of the LED light source.

19. The method of claim 14, wherein the reference signal is proportional to the input voltage of the LED light source.

20. The method of claim 14, further comprising comparing the LED current to a reference current.

* * * * *